T. C. Hargrave.
Rotary Meter.
N° 90,535.    Patented May 25, 1869.

Witnesses.
P. E. Teschemacher
W. J. Cambridge

Inventor.
T. C. Hargrave

United States Patent Office.

THOMAS C. HARGRAVE, OF BOSTON, MASSACHUSETTS.

Letters Patent No. 90,535, dated May 25, 1869.

---

IMPROVEMENT IN WATER-METERS.

---

The Schedule referred to in these Letters Patent and making part of the same.

---

*To all whom it may concern:*

Be it known that I, THOMAS C. HARGRAVE, of Boston, in the county of Suffolk, and State of Massachusetts, have invented certain new and useful Improvements in Meters for Measuring the Flow of Water or other Liquids, of which the following is a full, clear, and exact description, reference being had to the accompanying drawings, making part of this specification, in which—

Figure 1:
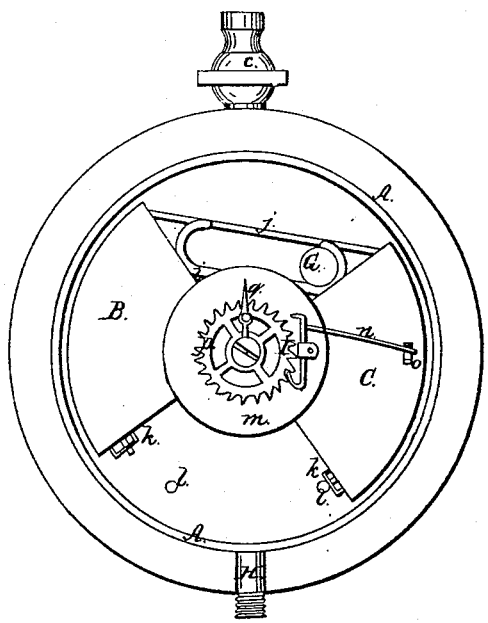
Figure 1 is a front elevation of my improved meter, the front plate of the casing being removed.

This invention has for its object to produce a cheap, simple, and durable meter, which will accurately measure and register the quantity of water, or other liquid passing through it, and consists in two balanced measuring-chambers, connected together and arranged within a casing, in combination with a shifting counterbalance-weight, which moves on a suitable guideway, from one side to the other, and serves to hold down the chamber from which the liquid is being discharged, not only until it is entirely empty, but until a quantity of liquid, exceeding in weight that of the shifting counterbalance, has entered the opposite chamber, the shifting counterbalance thus exactly weighing and regulating the quantity of liquid received and discharged at each oscillation of the chambers, which are provided at or near their lowest points with valves, which are opened by their stems coming into contact with stationary stops, as the chambers oscillate, to allow the liquid to escape into the lower portion of the casing, from which it passes to the delivery-pipes as required.

To enable others skilled in the art to understand and use my invention, I will proceed to describe the manner in which I have carried it out.

In the said drawings—

A represents the outer casing, of circular or other suitable form, within which are arranged two oscillating measuring-chambers, B C, each made in the form of the sector of a cylinder, or of other suitable shape, the two being connected together by a hollow bearing, $b$, which is bored out accurately, so as to fit over the end of a hollow shaft or axis, D, which extends through from the rear of the casing A, and communicates with the pipe E, through which the water or other liquid is admitted to the meter, a stop-cock, $c$, being provided for the purpose of shutting off the supply of water or other liquid when desired.

The bearing $b$ is provided with two inlet-ports $d$ $e$, which communicate with the interior of the chambers B C, and through these ports, and two ports $f$ $g$, in the hollow axis D, communication is established at the proper times between the hollow axis D and the measuring-chambers, so as to allow the water or other liquid to enter them alternately, as required.

G is a shifting counterbalance-weight, which is of cylindrical form, and is provided with grooves $h$, extending entirely around it, into which fit the strips or ways $i$, upon which the weight rolls, the grooves $h$, in connection with a rod, $j$, serving to prevent the weight from being thrown off the ways, the ends of which are turned up so as to form stops, against which the weight strikes, as it moves from one side to the other.

Each of the measuring-chambers B C is provided, at or near its lowest point, with a "check-valve," $k$, which is thrown open by its stem striking against a pin, or stop, $l$, as the chamber is carried down by the weight of the liquid which it contains, and the movement of the shifting counterbalance G, the opening of the valve allowing the liquid to escape freely from the chamber into the lower portion of the casing A, from which it passes to the delivery-pipe H.

The stops $l$ also serve to limit the amount of oscillation of the chambers B C, and prevent them from being carried too far in either direction.

The valves $k$ are made considerably larger than the inlet-ports, so as to insure one chamber being entirely emptied before the oscillation takes place, and before the liquid fills the opposite chamber.

I is the registering-apparatus, consisting of an ordinary clock-escapement, which is attached to a circular plate, $m$, screwed on to the end of the hollow axis D, the outer end of the arm $n$ engaging with a forked projection, $o$, on the chamber C, so that each oscillation will cause the wheel $p$ to be moved forward a certain distance, when the hand, or index $q$, attached thereto, will register the number of oscillations, and consequently the quantity of liquid which passes through the meter.

Any other suitable registering-apparatus may, however, be employed, if desired.

The front plate $r$, of the casing A, is made removable, and is provided with an aperture in the centre, surrounded by a flange, $s$, in which is fitted a glass plate, $t$, which thus affords a view of the registering-apparatus.

Each of the measuring-chambers is provided with a small aperture, $u$, which allows the air to escape, when the chamber is being filled.

Figure 2:
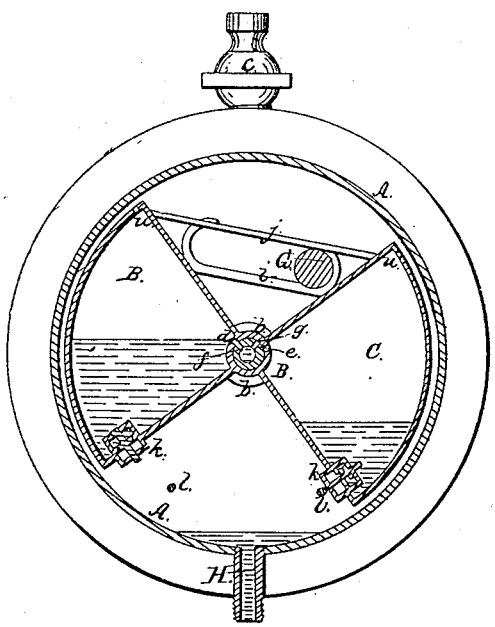
Figure 2 is a longitudinal vertical section, through the centre of the same.
Figure 3:
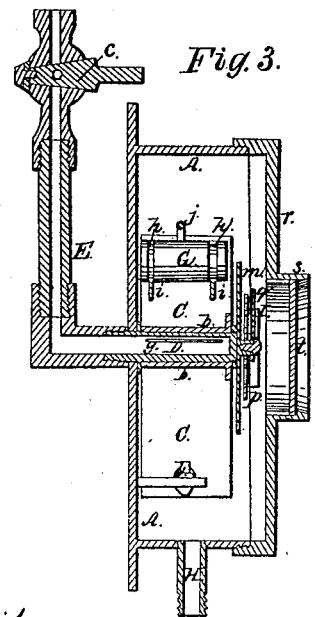
Figure 3 is a transverse vertical section, through the centre of the same.
Figure 4:
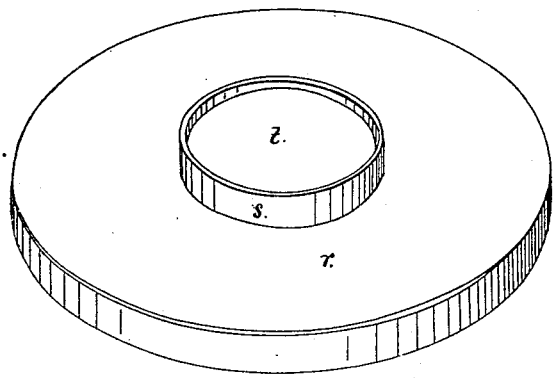
Figure 4 is a view of the front plate of the casing, detached.
Figure 5:
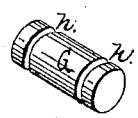
Figure 5 is a view of the shifting counterbalance-weight, detached.

The operation of my improved meter is as follows:

The parts being in the position seen in figs. 1 and 2, the liquid passes from the hollow axis D, through the ports $f$ $d$, into the measuring-chamber B, the liquid contained in the opposite chamber C being at the same time discharged, through its valve $k$, into the lower portion of the casing A.

As soon as the weight of the liquid in the chamber B exceeds that of the counterbalance G, which cannot occur until the opposite chamber C has become entirely empty, owing to the size of the valve $k$, as before stated, the measuring-chambers are oscillated upon the hollow axis D, causing the counterbalance G to roll upon its ways $i$ to the opposite side adjacent to the chamber B, which is thus held down, not only by the weight of the liquid which it contains, but also by the additional weight of the counterbalance G.

This oscillation of the measuring-chambers closes the communication between the chamber B and the hollow axis D, and at the same time brings the port $e$ opposite to the port $g$, when the liquid will commence to enter the chamber C, that contained in the chamber B, being at the same time discharged through its valve $k$.

The chambers are again oscillated as soon as the weight of the liquid in the chamber C exceeds that of the counterbalance G, and the operation continues as before.

By the employment of a shifting counterbalance, G, as above described, it will be seen that the measuring-chambers are prevented from oscillating, not only until the one being discharged is entirely empty, but until a quantity of liquid, equal in weight to that of the counterbalance, has entered the opposite chamber, and the meter is thus caused to work with certainty and regularity, and measure accurately the quantity of water or other liquid passing through it—desiderata heretofore unattained in that class of meters provideed with oscillating measuring-chambers where an ordinary counterpoise-weight has been employed.

I do not confine myself to the particular construction and arrangement of the counterbalance G, as it may be constructed and applied in a variety of ways, so as to move from one side to the other, as the chambers oscillate.

The above-described meter, when used to measure the flow of the water, is not designed to be placed in the cellar, or lower portion of a building, but is intended to be placed on each floor, above the point from which the water is to be drawn, and as it does not require any pressure to operate it, as is the case in water-meters provided with pistons or diaphragms, it may be placed in situations where the latter would not operate.

Claims.

What I claim as my invention, and desire to secure by Letters Patent, is—

A rolling or sliding counterbalance-weight G, in combination with the oscillating measuring-chambers B C, operating substantially in the manner and for the purpose described.

Also, the measuring-chambers B C, balanced upon a hollow tube or axis, D, provided with ports, through which the liquid is received, in combination with a rolling or sliding counterbalance-weight, G, and the casing A, substantially as set forth.

Also, the valves $k$, and stationary stops $l$, in combination with the oscillating measuring-chambers B C, and a rolling or sliding counterbalance-weight, G, operating substantially as described.

T. C. HARGRAVE.

Witnesses:
P. E. TESCHEMACHER,
W. J. CAMBRIDGE.